United States Patent
Jung et al.

(10) Patent No.: US 11,146,647 B2
(45) Date of Patent: Oct. 12, 2021

(54) USER DEVICE ESTIMATING ACTIVITY STATE OF USER IN HOME NETWORK AND CONTROL METHOD THEREOF

(71) Applicant: SAMSUNG ELECTRONICS CO., LTD., Suwon-si (KR)

(72) Inventors: Jinhe Jung, Suwon-si (KR); Sungwon Kim, Suwon-si (KR); Yunhu Ji, Suwon-si (KR); Yunhee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/732,910

(22) Filed: Jan. 2, 2020

(65) Prior Publication Data

US 2020/0213407 A1  Jul. 2, 2020

(30) Foreign Application Priority Data

Jan. 2, 2019  (KR) .......................... 10-2019-0000463

(51) Int. Cl.
*H04L 29/08* (2006.01)
*H04L 12/28* (2006.01)

(52) U.S. Cl.
CPC .......... *H04L 67/22* (2013.01); *H04L 12/2807* (2013.01); *H04L 12/2829* (2013.01); *H04L 67/306* (2013.01)

(58) Field of Classification Search
CPC ... H04L 67/22; H04L 67/306; H04L 12/2803; H04L 12/2807; H04L 12/2816; H04L 12/2818; H04L 12/2823; H04L 12/2827; H04L 67/10; H04L 67/12; H04L 67/125

USPC ......................................................... 709/224
See application file for complete search history.

(56) References Cited

U.S. PATENT DOCUMENTS

| | | |
|---|---|---|
| 2013/0166699 A1 | 6/2013 | Derozard |
| 2015/0309484 A1 | 10/2015 | Lyman |
| 2016/0028670 A1 | 1/2016 | Lott et al. |
| 2016/0260320 A1* | 9/2016 | Fadell ..................... G08C 17/02 |
| 2017/0108839 A1* | 4/2017 | Ganesan .................. F24F 11/30 |
| 2017/0242412 A1 | 8/2017 | Kim |

(Continued)

FOREIGN PATENT DOCUMENTS

| | | |
|---|---|---|
| JP | 2018-132802 A | 8/2018 |
| KR | 10-2017-0047117 A | 5/2017 |
| KR | 10-2017-0116306 A | 10/2017 |

OTHER PUBLICATIONS

International Search Report (PCT/ISA/210) dated Apr. 17, 2020 issued by the International Searching Authority in International Application No. PCT/KR2020/000045.

(Continued)

*Primary Examiner* — Glenford J Madamba
(74) *Attorney, Agent, or Firm* — Sughrue Mion, PLLC

(57) ABSTRACT

A user device is provided to estimate an activity state in a home network. A user device may include a memory configured to store instructions and a processor configured to execute the stored instructions. The processor is configured to obtain context information and control information of at least one external electronic device from the at least one external electronic device; estimate a first activity state of a user using the context information and the control information; and transmit the first activity state to the at least one external electronic device.

14 Claims, 19 Drawing Sheets

(56) References Cited

U.S. PATENT DOCUMENTS

| | | |
|---|---|---|
| 2017/0344243 A1 | 11/2017 | Fadell et al. |
| 2018/0005125 A1 | 1/2018 | Fadell et al. |
| 2018/0034657 A1 | 2/2018 | Brown et al. |
| 2018/0084057 A1 | 3/2018 | Wang et al. |
| 2018/0109988 A1 | 4/2018 | Clark |
| 2018/0191867 A1 | 7/2018 | Siebel et al. |
| 2018/0268632 A1 | 9/2018 | Malhotra |

OTHER PUBLICATIONS

Written Opinion (PCT/ISA/237) dated Apr. 17, 2020 issued by the International Searching Authority in International Application No. PCT/KR2020/000045.

\* cited by examiner

USER DEVICE ESTIMATING ACTIVITY STATE OF USER IN HOME NETWORK AND CONTROL METHOD THEREOF

CROSS-REFERENCE TO RELATED APPLICATION(S)

This application is based on and claims priority under 35 U.S.C. § 119 to Korean Patent Application No. 10-2019-0000463, filed on Jan. 2, 2019, in the Korean Intellectual Property Office, the disclosure of which is incorporated by reference herein in its entirety.

BACKGROUND

1. Field

The disclosure relates to a user device estimating activity state of a user in a home network and a control method thereof.

2. Description of Related Art

An increasing number and variety of services with additional functions are being provided through user devices, for example, portable electronic devices including smartphones. To increase the practical value of such electronic devices and to satisfy various user needs, communication service providers and electronic device manufacturers are providing a variety of functions and are competitively developing electronic devices in order to differentiate their services and products from those of other companies. Accordingly, various functions provided through electronic devices are also becoming sophisticated.

SUMMARY

Recently, with the development of home network technology, it is possible to provide a user with various services through a home network. For example, a user may control various electronic devices included in a home network using a user device (e.g., a smartphone). With the development of home network technology, the users of a home network want to receive a greater variety of services through the home network. Accordingly, there is a demand to develop a technology for controlling devices included in a home network in view of a user's utilization of the home network.

According to an embodiment, there is provided a user device including a memory configured to store instructions and a processor configured to execute the stored instructions. The processor is configured to obtain context information and control information of at least one external electronic device from the at least one external electronic device; estimate a first activity state of a user using the context information and the control information; and transmit the first activity state to the at least one external electronic device.

The processor is further configured to, based on power status information of the at least one electronic device, determine the first activity state of the user.

The processor is further configured to estimate preference information using the control information.

The processor is further configured to transmit the preference information to the at least one electronic device.

The processor is further configured to obtain a second activity state from a server, and the second activity state is an activity state estimated based on a family cluster to which the user device belongs.

The processor is further configured to transmit the second activity state to the at least one external electronic device.

The context information may include time information.

According to another embodiment, there is provided a control method of a user device, the control method including: obtaining context information and control information of at least one external electronic device from the at least one external electronic device; estimating a first activity state of a user using the context information and the control information; and transmitting the first activity state to the at least one external electronic device.

The first activity state of the user is determined based on power status information of the at least one external electronic device.

The control method further includes estimating preference information based on the control information.

The control method further includes transmitting the preference information to the at least one external electronic device.

The control method further includes obtaining a second activity state from a server, and the second activity state is an activity state estimated for a family cluster to which the user device belongs.

The control method further includes transmitting the second activity state to the at least one of external electronic device.

The context information may include time information.

According to another embodiment, there is provided a non-transitory computer-readable recording medium storing executable instructions, the executable instructions capable of causing a processor to: obtain context information and control information of at least one external electronic device from the at least one external electronic device; estimate a first activity state of a user using the context information and the control information; and transmit the first activity state to the at least one external electronic device.

The first activity state of the user is determined based on power status information of the at least one external electronic device.

The executable instructions are further capable of causing the processor to estimate preference information using the control information.

The executable instructions are further capable of causing the processor to transmit the preference information to the at least one external electronic device.

The executable instructions are further capable of causing the processor to obtain a second activity state from a server, and the second activity state is an activity state estimated for a family cluster to which the user device belongs.

The executable instructions are further capable of causing the processor to transmit the second activity state to the at least one external electronic device.

Accordingly, it is possible to provide a home network service according to the intent of a user by estimating the current activity of a user using control information of devices forming the home network and by providing a user-preferred function on the basis of the estimated activity of the user.

Furthermore, it is possible to estimate an activity state of a user even in the absence of a particular device (e.g., an oven) in a home network by estimating the activity state on the basis of the activity state of other members similar to the user of the user device.

BRIEF DESCRIPTION OF DRAWINGS

The above and other aspects, and features of certain embodiments of the disclosure will become more apparent

DETAILED DESCRIPTION

Figure 1A:
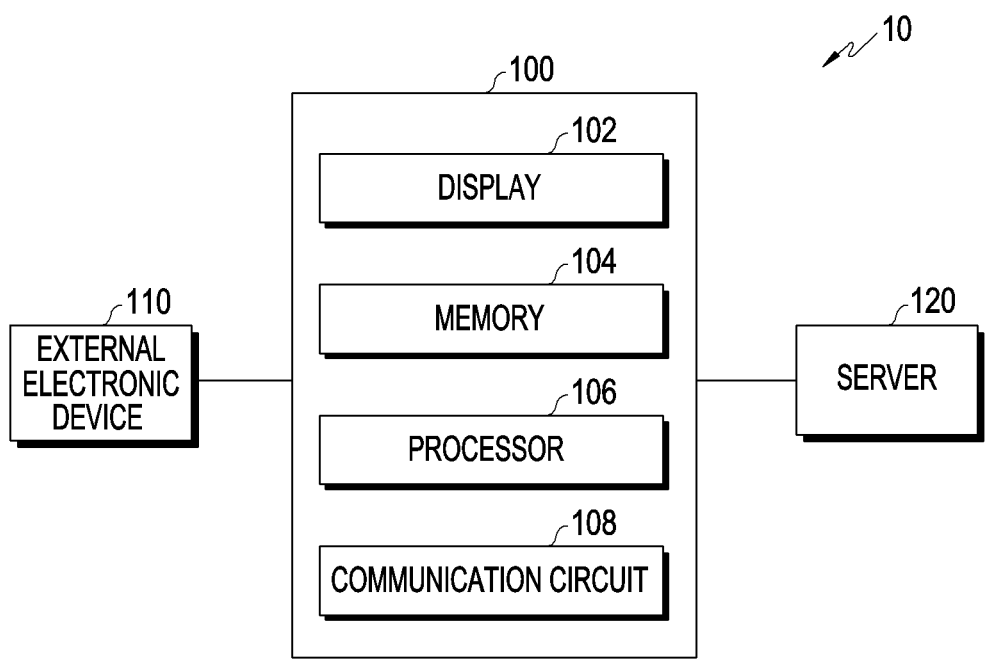
FIGS. 1A, 1B and 1C illustrate block diagrams of an external electronic device, a user device, and a server according to various embodiments.
Figure 1B:
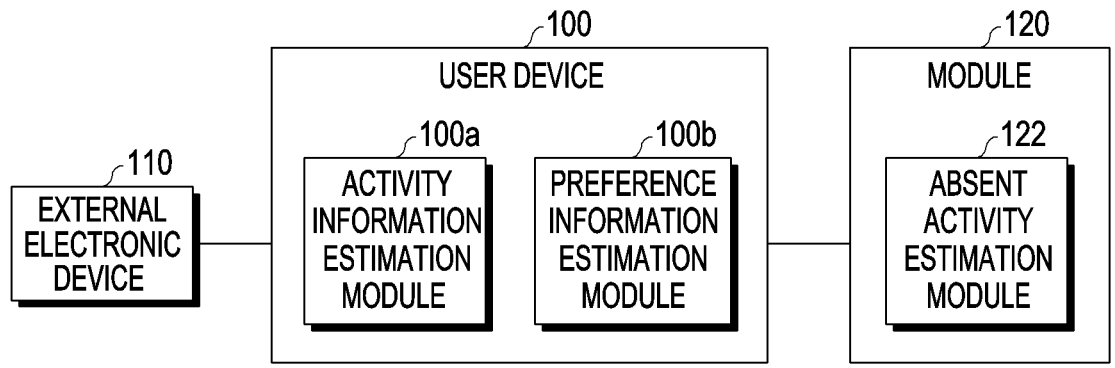
Figure 1C:
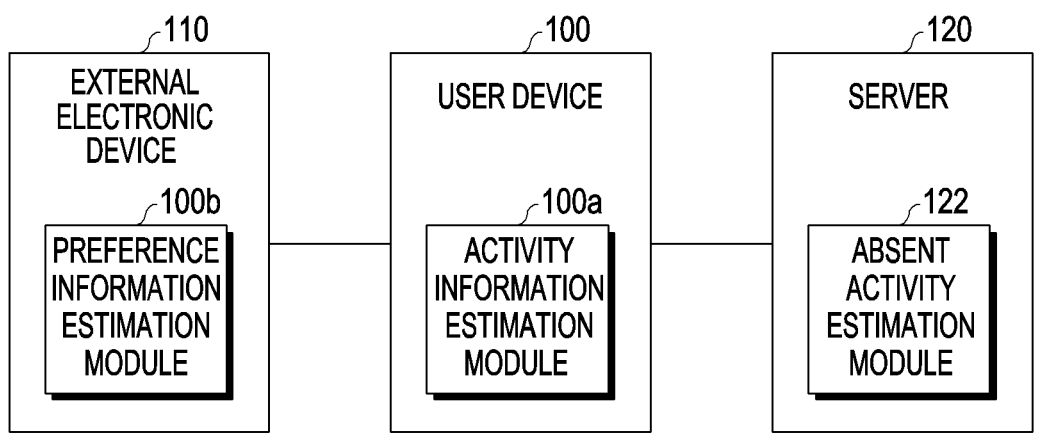

FIGS. 1A to 1C illustrate block diagrams of an external electronic device, a user device, and a server according to various embodiments.

Referring to FIG. 1A, a home network system 10 may include at least one of a user device 100, an external electronic device 110, and a server 120. The user device 100 may include a display 102, a memory 104, a processor 106, and a communication circuit 108.

The display 102 may visually provide information to a user of the user device 100. The display 102 may include touch circuitry configured to detect a touch or sensor circuitry (e.g., a pressure sensor) configured to measure the strength of force generated by the touch.

The memory 104 may store various data used by at least one component (e.g., the processor 106) of the user device 100. The data according to various embodiments of the disclosure may include, for example, software (e.g., a program), and input and output data of commands relating to the software. The memory 104 may include volatile memory or nonvolatile memory.

The processor 106 may execute, for example, software (e.g., a program) to control at least one other component (e.g., a hardware or software component) of the user device 100 connected to the processor 106, and may perform various types of data processing or arithmetic operations. According to various embodiments of the disclosure, as at least part of the data processing or operations, the processor 106 may load a command or data received from another component (e.g., the communication circuit 108) into the volatile memory, may process the command or data stored in the volatile memory, and may store the resulting data in the nonvolatile memory. The processor 106 may include a main processor (e.g., a central processing unit or an application processor) and a coprocessor (e.g., a graphics processing unit, an image signal processor, a sensor hub processor, or a communications processor) that is operable independently of or together with the main processor. Additionally or alternatively, the coprocessor may be configured to use lower power than the main processor or to specialize in a designated function. The coprocessor may operate separately from the main processor or as a part thereof. The coprocessor may control at least some of the functions or states associated with at least one component (e.g., the display 102) among the components of the user device 100. For example, the coprocessor may control some of the functions instead of the main processor when the main processor is in an inactive state (e.g., sleep), or along with the main processor when the main processor is in an active state (e.g., application-running). The coprocessor (e.g., an image signal processor or a communications processor) may be configured as a part of another functionally related component (e.g., the communication circuit 108).

The communication circuit 108 may support establishing a direct (e.g., wired) communication channel or a wireless communication channel between the user device 100 and the external electronic device 110 and perform communication through the established communication channel. The communication circuit 108 may include one or more communication processors that operate independently of the processor 106 (e.g., an application processor) and support direct (e.g., wired) communication or wireless communication. The communication circuit 108 may include a wireless communication module (e.g., a cellular communication module, a short-range wireless communication module, or a Global Navigation Satellite System (GNSS) communication module) or a wired communication module (e.g., a Local Area Network (LAN) communication module or a power-line communication module). A communication module may communicate with the external electronic device 110 or the server 120 via a first network (e.g., a short-range communication network including a Bluetooth, Wi-Fi direct, or Infrared Data Association (IrDA) network) or a second network (e.g., a long-range communication network including a cellular network, the Internet, or a computer network (e.g., a LAN or WAN)). These various types of communication modules may be integrated into one component (e.g., a single chip) or may be configured as a plurality of separate components (e.g., a plurality of chips).

The external electronic device 110 may include various home network devices, for example, a TV, a stereo system, a washing machine, an air conditioner, an oven, or the like. The external electronic device 110 may be connected to the user device 100 through wired communication or wireless communication.

The server 120 may be connected to the user device 100 using wired communication or wireless communication. The server 120 may store various family profiles and other information associated with family profiles.

Referring to FIG. 1B, the user device 100 may include an activity state estimation module 100a and a preference information estimation module 100b. The activity state estimation module 100a and the preference information estimation module 100b may be implemented as at least some components of a processor. The activity state estimation module 100a may estimate activity state of a user (e.g., waking up or meal preparation) on the basis of context information (e.g., time and place) and control information of the external electronic device 110 (e.g., on/off information of the external electronic device 110). The preference information estimation module 100b may estimate a function or content (e.g., a sport channel) preferred by the user at a particular time (e.g., during a meal time) with respect to the external electronic device 110 (e.g., TV) using control information of the external electronic device 110 (e.g., a function being output from the external electronic device 110).

The server 120 may include an absent activity estimation module 122. The absent activity estimation module 122 may form a cluster of family members having similar characteristics and may apply the same estimation model to family members included in the same cluster.

According to another embodiment, referring to FIG. 1C, a preference information estimation module 100b may be included in the external electronic device 110. That is, an operation or function of estimating preference information may also be performed by the external electronic device 110.

Figure 2:
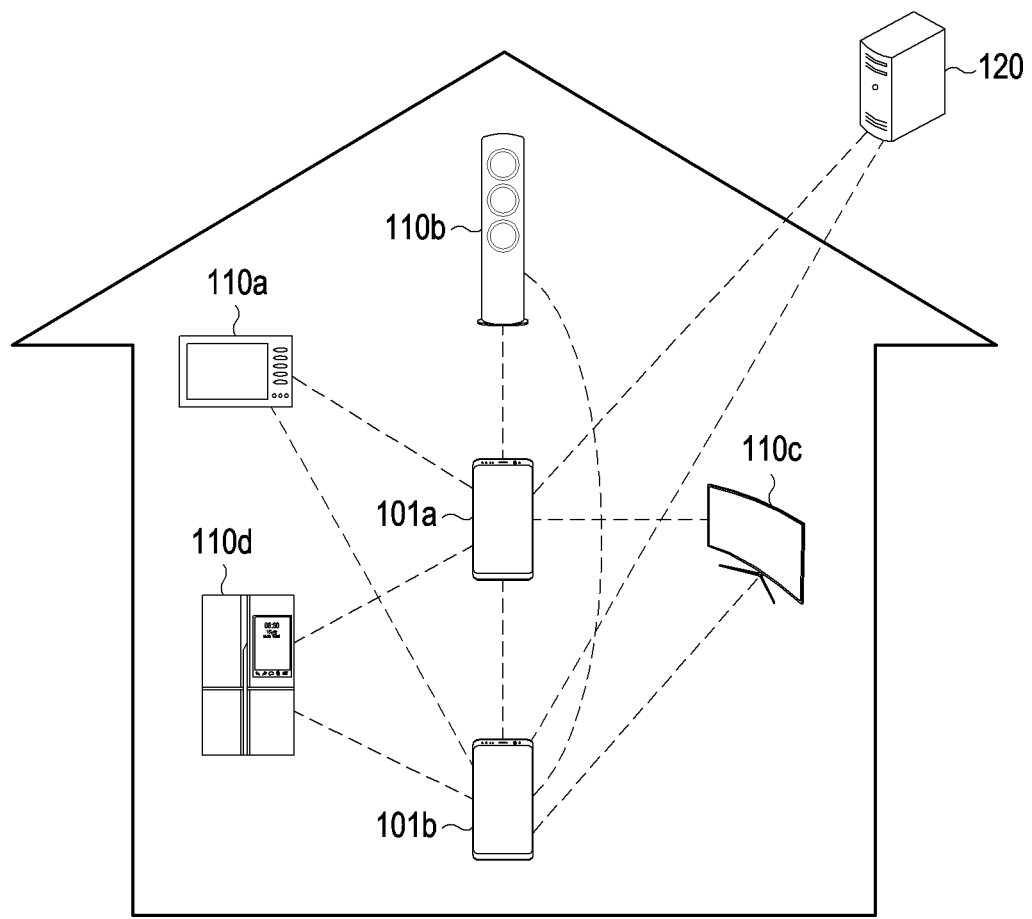
FIG. 2 illustrates a schematic diagram of a home network according to an embodiment.

FIG. 2 illustrates a schematic diagram of a home network according to an embodiment.

Referring to FIG. 2, a first user device 101a (e.g., the user device 100 of FIG. 1A) may be connected with a second user device 101b through wired communication or wireless communication. A plurality of external electronic devices 110a-110d (e.g., a first external electronic device 110a, a second external electronic device 110b, a third external electronic device 110c, and a fourth external electronic device 110d) may be connected to each of the user devices 101a and 101b through wired communication or wireless communication. Each of the user devices 101a and 101b may be connected to a server 120 through wired communication or wireless communication.

Figure 3A:
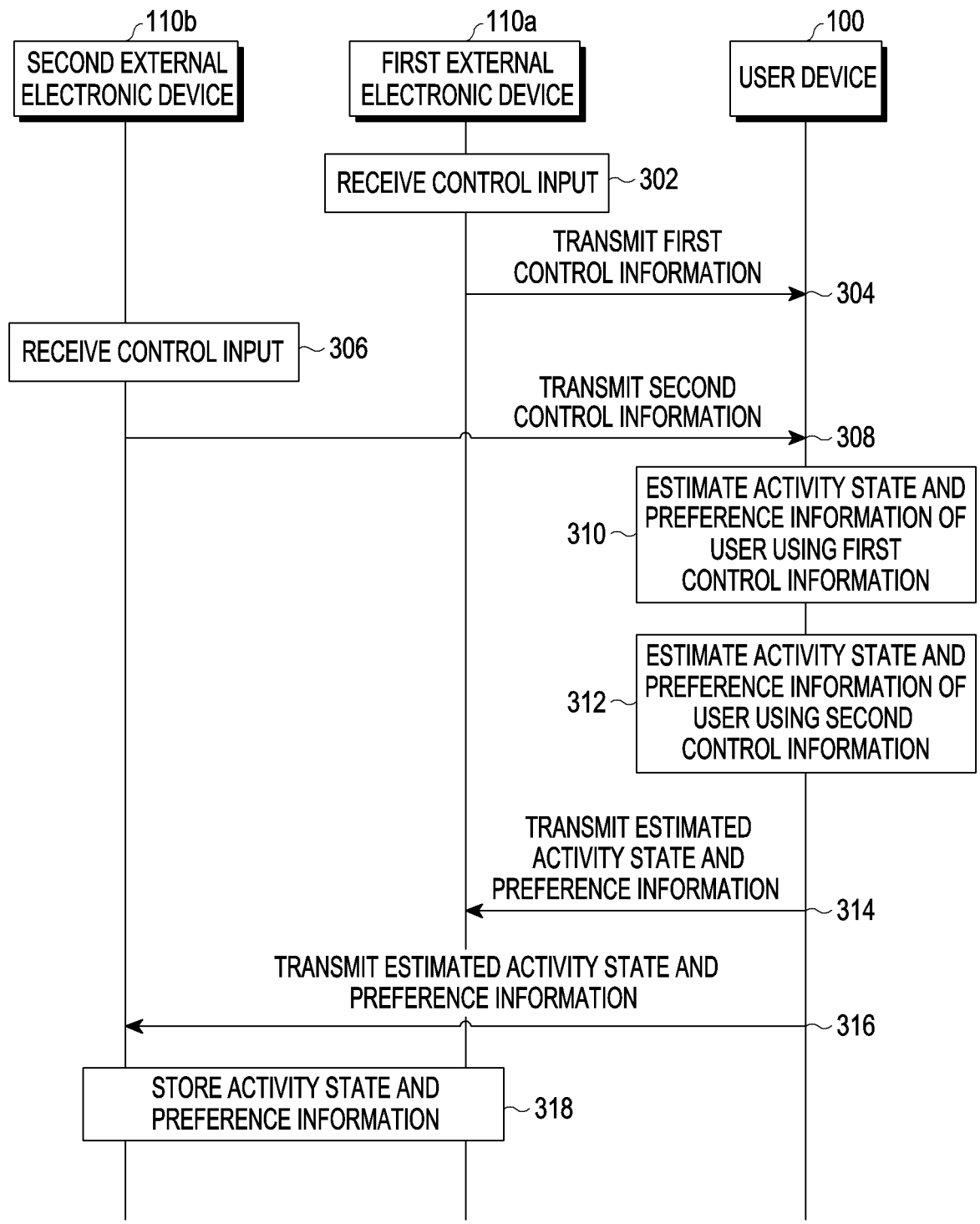
FIGS. 3A and 3B illustrate a method for estimating activity state and preference information of a user according to various embodiments.
Figure 3B:
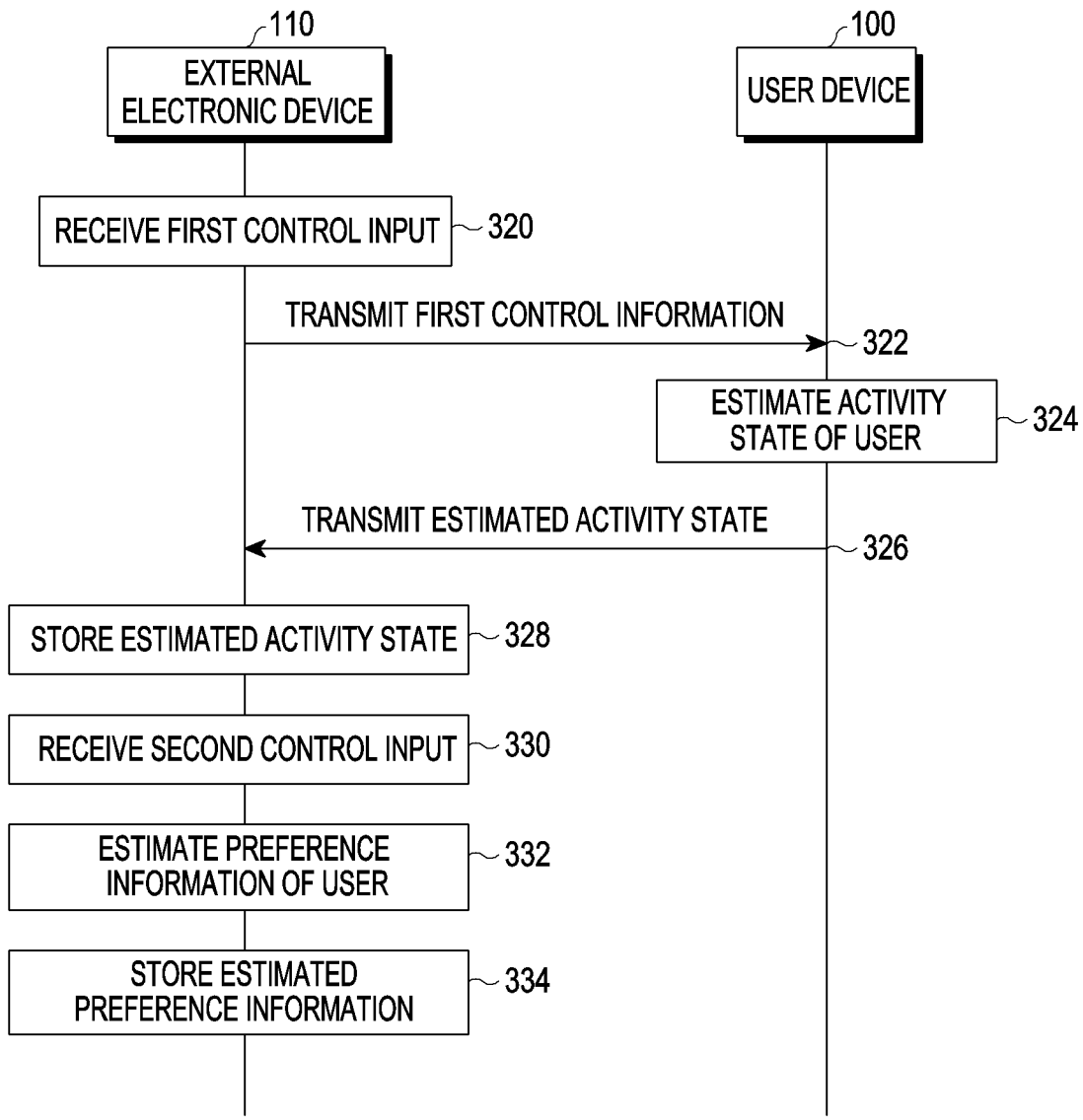

FIGS. 3A and 3B illustrate a method for estimating activity state and preference information of a user according to various embodiments.

Referring to FIG. 3A, in operation 302, a first external electronic device 110a (e.g., an oven) may receive first control input from a user. The first control input may include input to control a function of the first external electronic device 110a. The first control input may include, for example, at least some of input to turn on/off the first external electronic device 110a, input to switch a channel output by the first external electronic device 110a (e.g., a TV) to a particular channel, or input to change a particular temperature set in the first external electronic device 110a (e.g., an air conditioner). The first control input may include information about the time for which a particular function is maintained. For example, the first control input may be configured to control the time for which a particular channel on a TV or a particular temperature of an air conditioner is maintained. In operation 304, the first external electronic device 110a may transmit first control information to a user device 100.

In operation 306, a second external electronic device 110b (e.g., a TV) may receive second control input from the user. Similar to the first control input, the second control input may include at least some of input to turn on/off the second external electronic device 110b, input to switch to a particular channel or input to set a particular temperature, and information about the time for which a particular channel or a particular temperature may be maintained. However, the embodiments described above with respect to the first control input and the second control input are merely examples and are not limited thereto. In operation 308, the second external electronic device 110b may transmit second control information to the user device 100. Operations 302 to 308 may be repeatedly performed over a specified period (e.g., one week or one month) from a particular start time.

In operation 310, the user device 100 may estimate activity state of the user and preference information of the user using the first control information. FIG. 3A illustrates an embodiment of estimating the activity state and preference information of the user using control information received preferentially in time among pieces of control information transmitted from a plurality of external electronic devices. For example, when it is identified that the on/off state of an external electronic device (e.g., an oven or a refrigerator) is changed, the user device 100 may identify that the current activity state of the user is a state of "preparing a meal". As another example, when it is identified that the on/off state of an external electronic device (e.g., a TV) is changed, the user device 100 may identify that the current activity state of the user is a state of "taking a rest". In addition, when it is identified that the on/off state of an external electronic device (e.g., a dishwasher) is changed, the user device 100 may identify that the current activity state of the user is a state of "cleaning". According to an embodiment, after a predetermined time (e.g., 30 minutes) from the time at which "preparing a meal" is estimated (e.g., when the first control information is received), the user device 100 may identify that the activity state of the user is a state of "having a meal". Also, the user device 100 may determine that a specified time determined by the user has lapsed, and may use an alarm application installed in the user device 100 to notify the user. Furthermore, when the use of an application installed in the user device 100 by the user, or the movement of the user device 100 after a specified time (e.g., three hours) is detected, the user device 100 may identify that the activity state of the user is a state of "waking up". When an application is executed by the user, the user device 100 may identify a current location using a geofence value (e.g., a geofence area) and may identify whether the user (or user device) is located at home or outside using the identified geofence value. The user device 100 may detect the movement of the user device 100 or the use of an application, and may identify that the activity state of the user is the state of "taking a rest" when an idle time is a specified time (e.g., 3 hours) or longer. In this case, the user device 100 may further estimate that the user has been in a resting state for about three hours prior to the current time. The user device 100 may estimate the activity state and preference information of the user according to the frequency of a particular action of the user or the frequency of a function output from the external electronic device 110. In other words, if the frequency of a particular action of the user or the frequency of a function output from the external electronic device 110 is higher than a specified threshold rate, the activity state and preference information of the user may be identified accordingly. In addition, the user device 100 may estimate a time at which a particular action of the user (e.g., the state of "preparing a meal") occurs. For example, the user device 100 may analyze the first control information collected for a specified period (e.g., one month), and may predict a particular action of the user, for example "preparing a meal" occurs at 7 a.m., based on the rate or frequency at which the state of "preparing a meal" occurs in the collected first control information. More specifically, if the user device 100 determines that the first control information collected for one month identifies that the frequency at which the user starts preparing a meal at 7 a.m. (including a predetermined error range (e.g., 6:58 a.m.)) is, for example, 80% or higher, then the user device 100 may predict that the user will start preparing a meal at 7 a.m. on a certain day. The user device 100 may determine whether the particular action of the user, "preparing a meal", occurs on the basis of a change in the on/off state of an external electronic device (e.g., an oven or a refrigerator). The user device 100 may also estimate the time for which the particular action of the user is maintained. For example, when the particular action of the user "preparing a meal" is estimated to have occurred at 7 a.m., the user device 100 may estimate that the particular action of "preparing a meal" may be maintained for a predetermined time (e.g., 30 minutes). The predetermined time according to various embodiments may vary according to different action taken by the user. For example, the predetermined time may be designated to be 2 hours for the activity state of "taking a rest" and 1 hour for the activity state of "having a meal". Alternatively, when a different activity state (e.g., an activity state of "going out") is estimated to start after a particular activity state (e.g., the activity state of "having a meal") is finished, the user device 100 may estimate that the start time of the different activity state is the termination time of the particular activity state (i.e., the retention time of the particular activity state).

In operation 312, the user device 100 may estimate activity state of the user and preference information of the user using the second control information. According to various embodiments, when the activity state of the user is currently estimated to be "cooking", the user device 100 may identify a function or content executed in the second external electronic device 110b during a time estimated for "cooking". For example, the user device 100 may estimate, using the received second information, content (e.g., a sports channel) executed in the second external electronic device 110b (e.g., a TV) during the time estimated for "cooking" as the preference information of the user. As another example, the user device 100 may estimate a function (e.g., a setting temperature of 24 degrees) executed in the second external electronic device 110b (e.g., an air conditioner) during the time estimated for "cooking" as the preference information of the user.

In operation 314, the user device 100 may transmit the estimated activity state and the estimated preference information to the first external electronic device 110a. In operation 316, the user device 100 may transmit the estimated activity state and the estimated preference information to the second external electronic device 110b.

In operation 318, the first external electronic device 110a and the second external electronic device 110b may store the activity state and the preference information received from the user device 100. According to an embodiment, the activity state and the preference information received from the user device 100 may be stored in a mapping table, as illustrated below, in the first external electronic device 110a and the second external electronic device 110b. Referring to Table 1 below, context information is described, for example, as time. However, the context information is not limited thereto. The context information may include various pieces of information, such as season information, day information, and date information.

TABLE 1

| Context information | Activity state | TV preference information |
|---|---|---|
| 7 p.m.~8 p.m. | Having a meal | Movie channel |
| 8 p.m.~10 p.m. | Taking a rest | Sports channel |

FIG. 3B illustrates an embodiment in which user preference information is estimated by an external electronic device 110. In operation 320, the external electronic device 110 may receive first control input. The first control input in operation 320 may include at least some of input to turn on/off the external electronic device 110, input to switch to a particular channel, input to set a particular temperature, and information about the time for which a particular channel or a particular temperature is maintained. In operation 322, the external electronic device 110 may transmit the first control information to a user device 100. In operation 324, the user device 100 may estimate the activity state of the user. In operation 326, the user device 100 may transmit the estimated activity state to the external electronic device 110. In operation 328, the external electronic device 110 may store the estimated activity state received from the user device 100.

In operation 330, the external electronic device 110 according to an embodiment may receive second control input. According to various embodiments of the disclosure, the second control input in operation 330 may refer to input that the external electronic device receives after receiving the first control input or simultaneously with the first control input. According to various embodiments of the disclosure, the second control information in operation 330, like the first control information, may include at least some of input to turn on/off the external electronic device 110, input to switch to a particular channel, input to set a particular temperature, and information about the time for which a particular channel or a particular temperature is maintained. According to an embodiment, operation 330 may be performed for a specified period (e.g., one week or one month).

In operation 332, the external electronic device 110 according to an embodiment may estimate preference information of a user according to the received estimated activity state of the user and the second control input. For a method for estimating the preference information, the method as described above in operation 312 may be applied. In operation 334, the external electronic device 110 may store the estimated preference information.

Figure 3C:
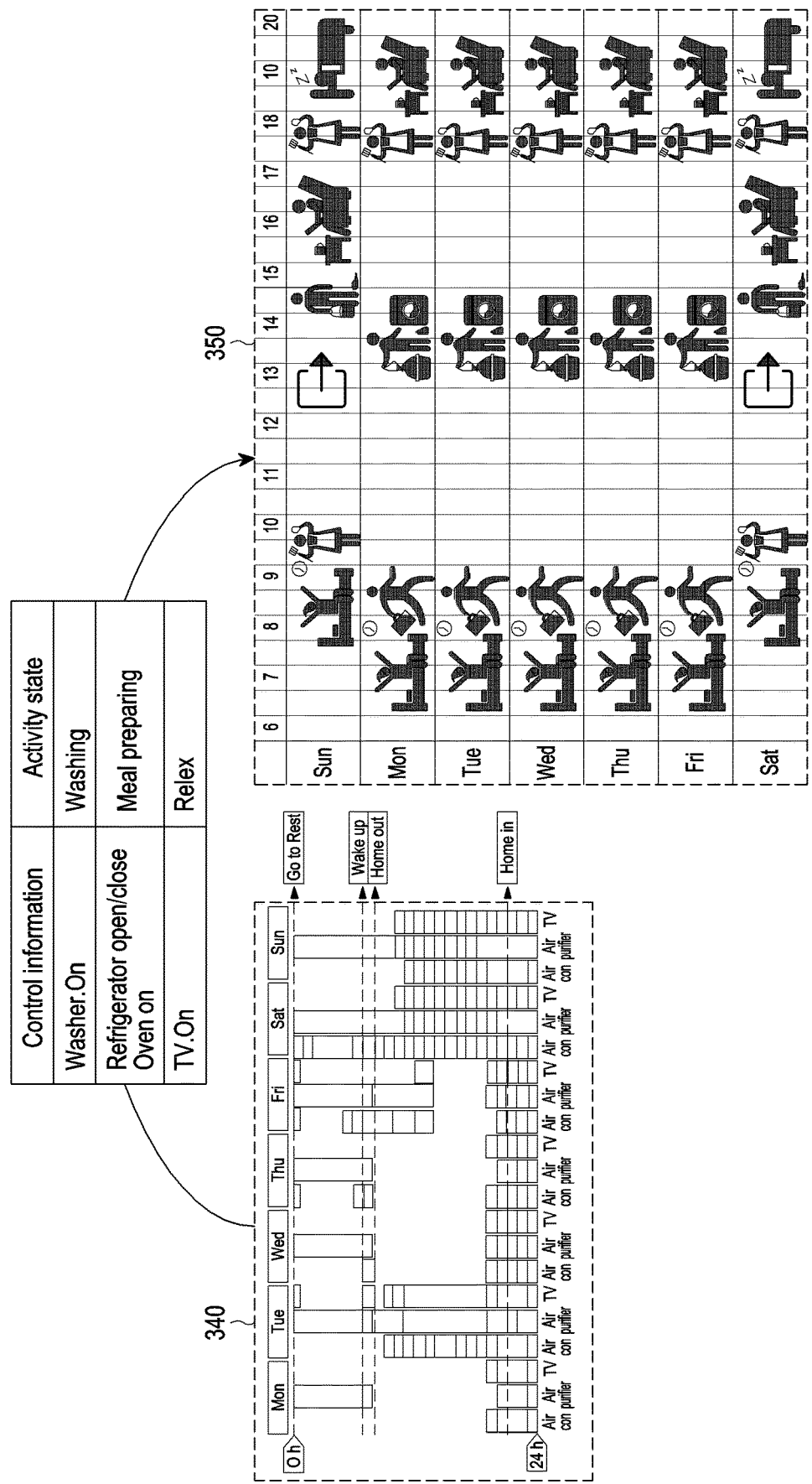
FIG. 3C shows a schematic diagram illustrating a method for estimating activity state of a user from control information of an external electronic device according to an embodiment.

FIG. 3C shows a schematic diagram illustrating a method for estimating the activity state of a user from control information of an external electronic device according to an embodiment.

Referring to FIG. 3C, a user device 100 may obtain or collect control information 340 from at least one external electronic device 110 (e.g., a TV, an air purifier, or an air conditioner) for a predetermined period (e.g., one week). The user device 100 may estimate the activity state of a user using the control information obtained from the at least one external electronic device. The estimated activity state 350 may include at least one activity state of the user (e.g., a wake-up state, a resting state, a state of preparing a meal, or a state of having a meal). Here, for example, an activity model of the user may include a list of activity states in which the activity states regularly occur during a certain time period. The activity models, derived based on past information on various activity states of the user, make it possible to predict the next activity state of the user.

Figure 3D:
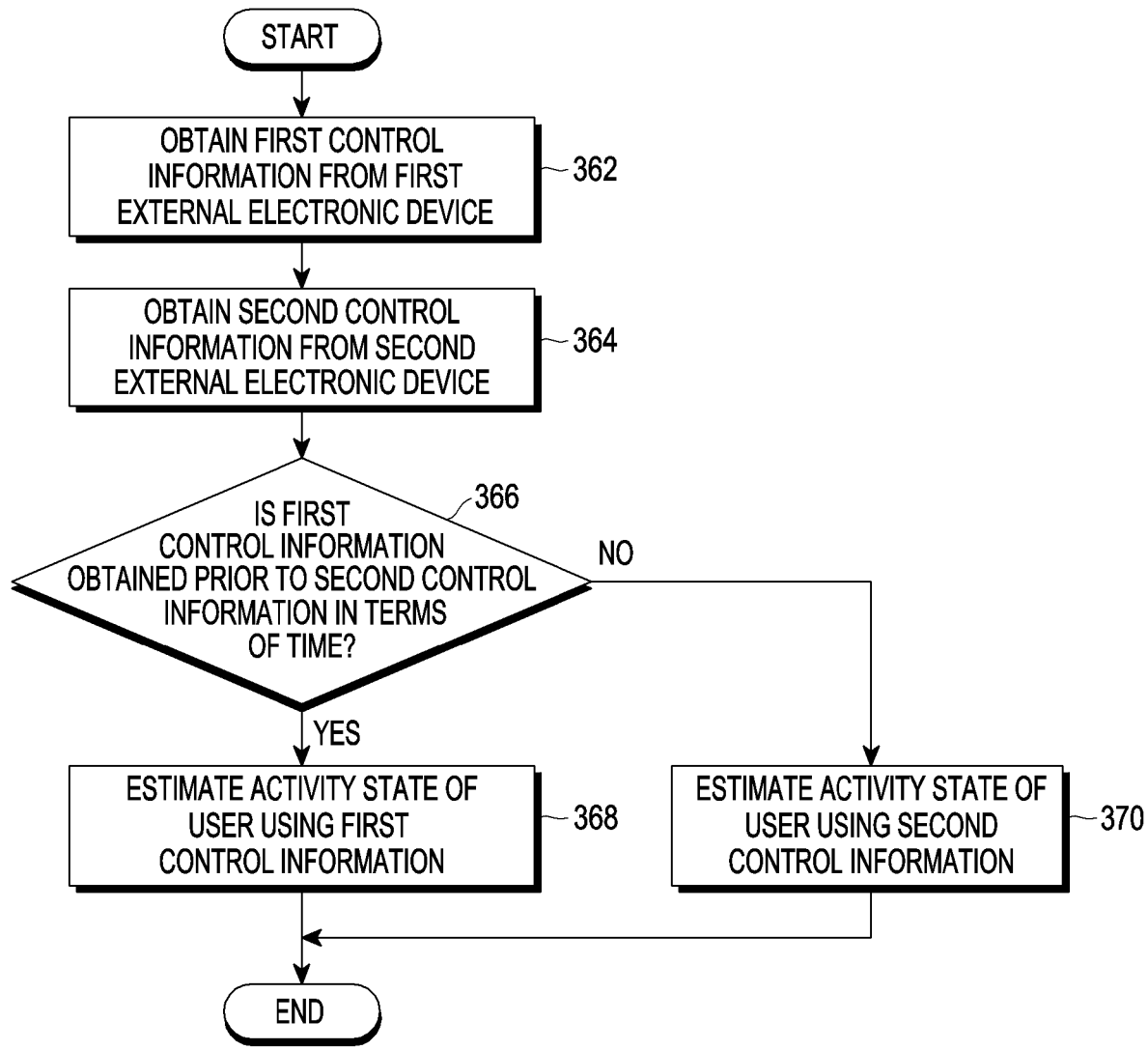
FIGS. 3D and 3E show flowcharts illustrating a method for estimating the activity state of a user when control information is received from a plurality of external electronic devices according to various embodiments.
Figure 3E:
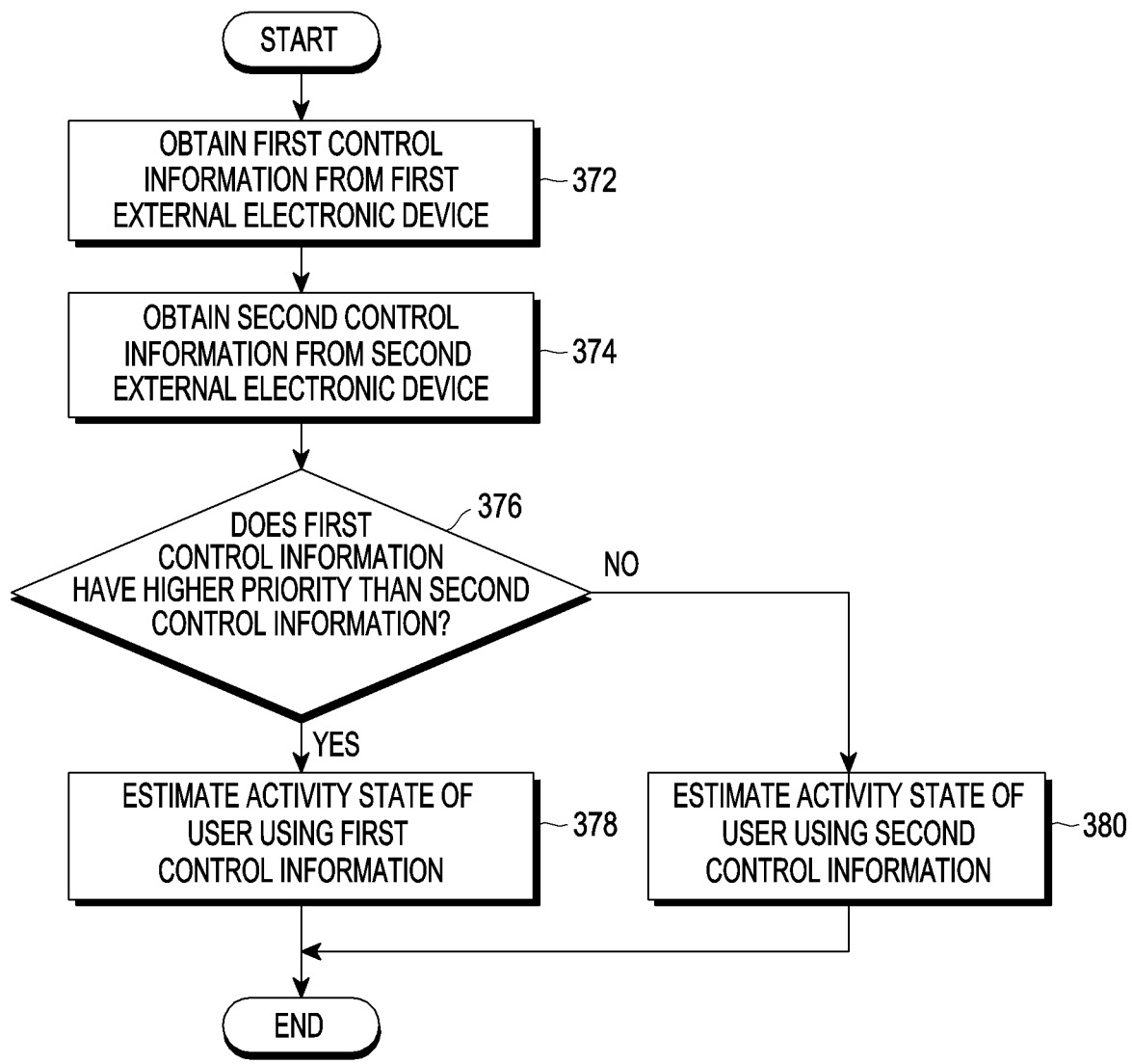

FIGS. 3D and 3E show flowcharts illustrating a method for estimating the activity state of a user when control information is received from a plurality of external electronic devices according to various embodiments.

Referring to FIG. 3D, in operation 362, a user device (e.g., the user device 100 of FIG. 1A) may obtain first control information from a first external electronic device. According to various embodiments of the disclosure, the first control information in operation 362 may include one or more inputs to turn on/off an external electronic device (e.g., the external electronic device 110 of FIG. 1A), switch to a particular channel, set a particular temperature, and information about a period for which a particular channel or a particular temperature is maintained. According to various embodiments of the disclosure, operation 362 may be repeatedly performed for a specified period (e.g., one week or one month).

In operation 364, the user device (e.g., the user device 100 of FIG. 1A) may obtain second control information from a second external electronic device. According to various embodiments of the disclosure, second control information in operation 364 may include one or more inputs to turn on/off an external electronic device (e.g., the external electronic device 110 of FIG. 1A), switch to a particular channel, set a particular temperature, and information about a period for which a particular channel or a particular temperature is maintained. According to various embodiments of the disclosure, operation 364 may be repeatedly performed for a specified period (e.g., one week or one month).

In operation 366, the user device may identify whether the first control information is obtained prior to the second control information in terms of time.

When the first control information is obtained prior to the second control information in terms of time ("Yes" in operation 366), the user device may estimate the activity state of the user using the first control information in operation 368. For example, when the first control information is an oven power state change (e.g., from off to on) and the second control information is a TV power state change (e.g., from off to on), the user device 100 may estimate that the activity state of the user is a state of "cooking". When the second control information is obtained prior to the first control information in terms of time ("No" in operation 366), the user device may estimate the activity state of the user using the second control information in operation 370. For example, when the first control information is an oven power state change (e.g., from off to on) and the second control information is a TV power state change (e.g., from off to on), the user device 100 may estimate that the activity state of the user is a state of "taking a rest".

Referring to FIG. 3E, in operation 372, a user device (e.g., the user device 100 of FIG. 1A) according to an embodiment may obtain first control information from a first external electronic device. According to various embodiments, the first control information in operation 372 may include at least one or more inputs to turn on/off an external electronic device (e.g., the external electronic device 110 of FIG. 1A), switch to a particular channel, set a particular temperature, and information about a period for which a particular channel or a particular temperature is maintained. According to various embodiments of the disclosure, operation 372 may be repeatedly performed for a specified period (e.g., one week or one month).

In operation 374, the user device may obtain second control information from a second external electronic device. According to various embodiments of the disclosure, the second control information in operation 374 may include at least one or more inputs to turn on/off an external electronic device, switch to a particular channel, set a particular temperature, and information about a period for which a particular channel or a particular temperature is maintained. According to various embodiments of the disclosure, operation 374 may be repeatedly performed for a specified period (e.g., one week or one month).

In operation 376, the user device may identify whether the first control information has a higher priority than the second control information.

When the first control information has a higher priority than the second control information in terms of time ("Yes" in operation 376), the user device may estimate the activity state of a user using the first control information in operation 378. A priority according to the various embodiments of the disclosure may be predetermined based on the type of an external electronic device. For example, an oven may have a higher priority than a TV, and the TV may have a higher priority than an air conditioner. Here, the priority may be determined based on the user's input, the user's historical usage of external electronic devices or activities carried by the user in each external electronic device. Specifically, when the first control information is an oven power state change (e.g., from off to on) and the second control information is a TV power state change (e.g., from off to on), even though the first control information is obtained prior to the second control information in terms of time, the user device 100 may estimate that the activity state of the user is a state of "cooking" according to the priorities of the external electronic devices. Alternatively, when the second control information has a higher priority than the first control information ("No" in operation 376), the user device may estimate the activity state of the user using the second control information in operation 380. According to the various embodiments of the disclosure, when the first control information is an oven power state change (e.g., from off to on) and the second control information is a TV power state change (e.g., from off to on), the user device 100 may estimate that the activity state of the user is a state of "taking a rest" according to the priorities of the external electronic devices.

Figure 3F:
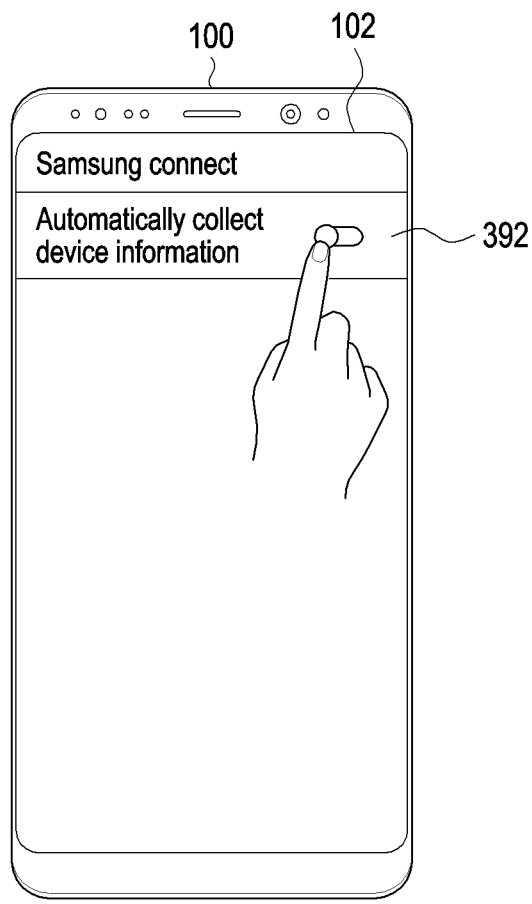
FIGS. 3F and 3G illustrate a user interface displayed while a user device obtains control information from various electronic devices forming a home network according to an embodiment.
Figure 3G:
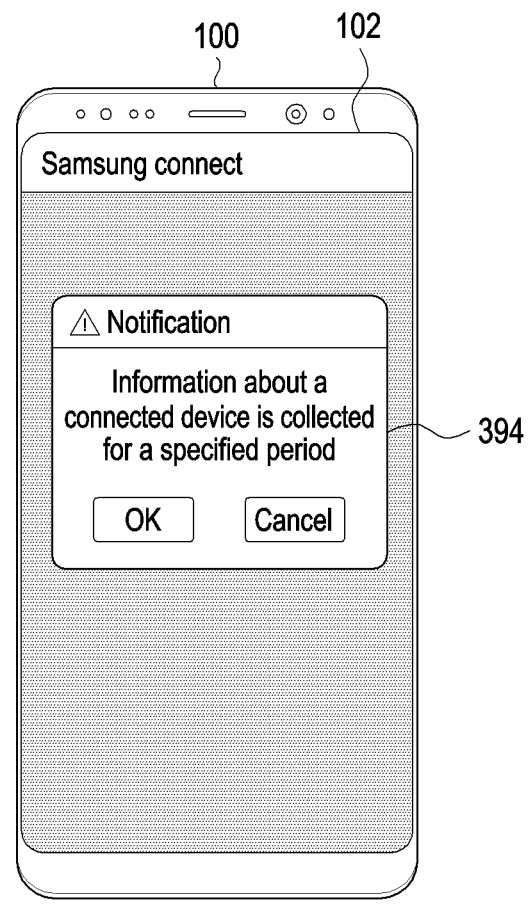

FIGS. 3F and 3G illustrate a user interface that is displayed while a user device 100 obtains control information from various electronic devices forming a home network according to an embodiment.

Referring to FIG. 3F, a user device 100 may display an interface 392 for receiving user input to obtain control information of an external electronic device (e.g., the external electronic device 110 of FIG. 1) for a specified period on a display 102. Referring to FIG. 3G, when receiving user input to obtain control information of an external electronic device (e.g., the external electronic device 110 of FIG. 1) for a specified period, a user device 100 may display a notification message 394 indicating that information about a device connected to the user device is collected for a specified period on the display 102.

Figure 4A:
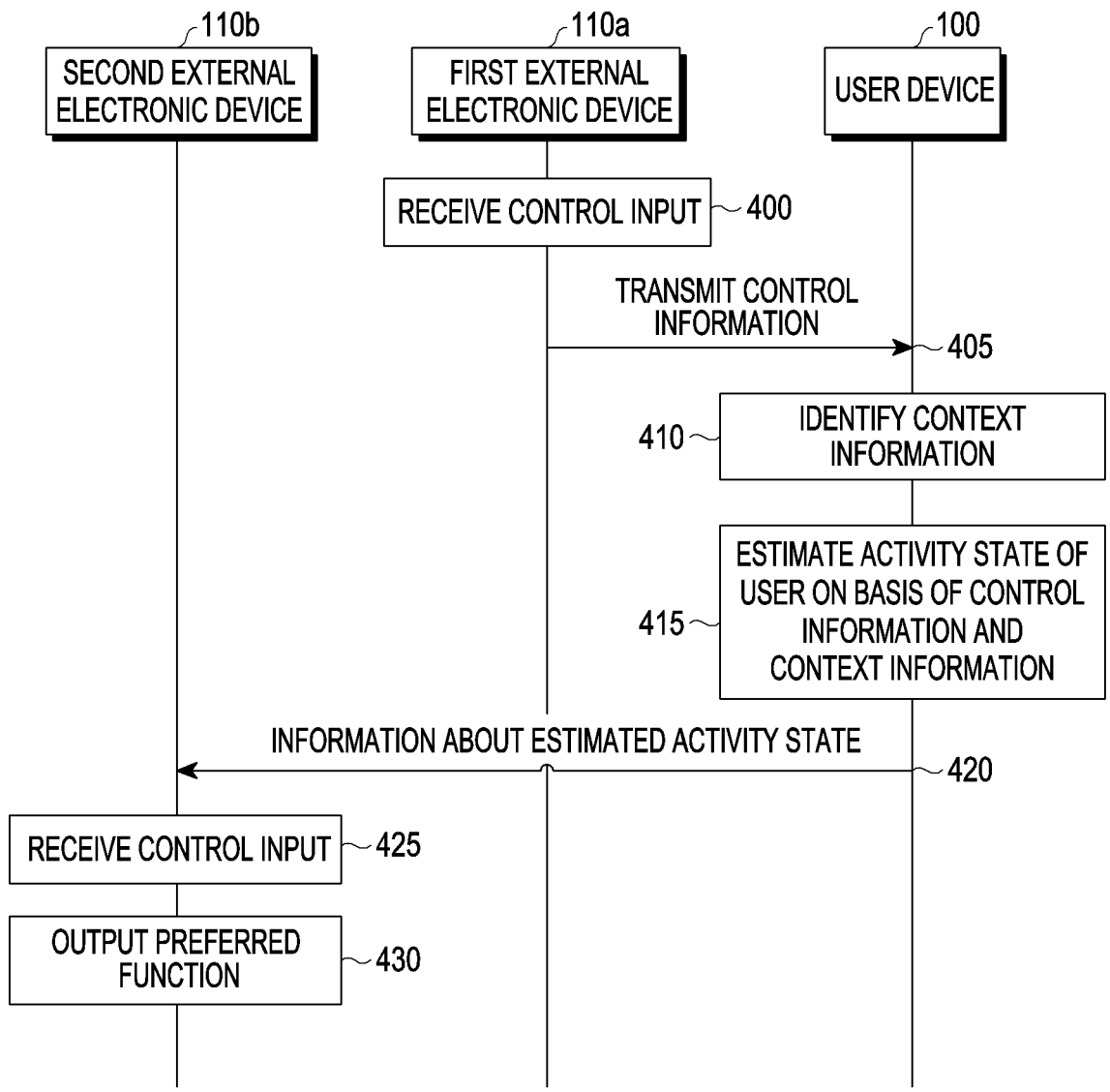
FIGS. 4A and 4B illustrate a method in which a user device estimates preference information of a user and transmits the estimated preference information to an external electronic device to output a function preferred by the user according to various embodiments.
Figure 4B:
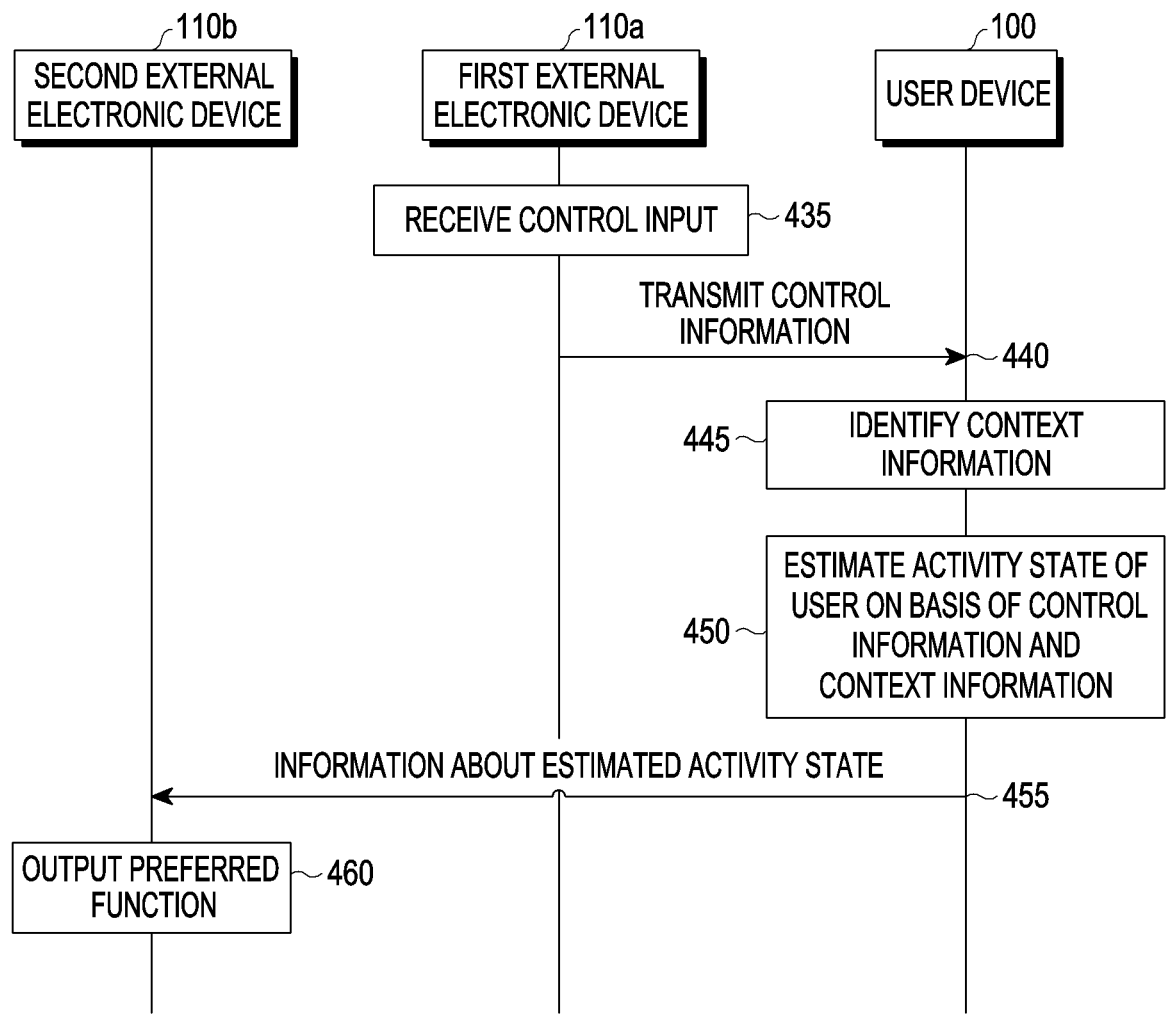

FIGS. 4A and 4B illustrate a method in which a user device 100 estimates preference information of a user and transmits the estimated preference information to an external electronic device to output a function preferred by the user according to various embodiments.

Referring to FIG. 4A, in operation 400, a first external electronic device 110a according to various embodiments may receive control input to control the first external electronic device 110a (e.g., an oven) from a user. The control input in operation 400 may include at least one or more inputs to turn on/off the external electronic device 110a, switch to a particular channel, set a particular temperature, as well as information about a period for which a particular channel or a particular temperature is maintained.

In operation 405, the first external electronic device 110a may transmit information about the state in which the first external electronic device 110a is controlled (e.g., information about a change in the on/off state of the first external electronic device 110a, information about currently output content, information about a currently set temperature, and/or information about currently output music) to a user device 100 according to the control input in operation 400.

In operation 410, the user device 100 may identify context information. The context information according to various embodiments may include time information, weather information, season information, and day information at the time of estimating the activity state of the user.

In operation 415, the user device 100 may estimate the activity state of the user on the basis of control information (e.g., on/off information) and the context information (e.g., time information). For example, when the time at which the activity state of the user is estimated (e.g., when the control information is received in operation 405) is 7 a.m. (e.g., learned time) and the control information is an oven power state change (e.g., from off to on), the user device 100 may identify that the activity state of the user is a state of preparing a meal. When the control information is an oven power state change (e.g., from off to on) but the time at which the activity state of the user is estimated (e.g., when the control information is received in operation 405) is, for example, 3 a.m., the user device 100 may identify that the activity state of the user is not a state of preparing a meal.

In operation 420, the user device 100 may transmit information about the estimated activity state to a second external electronic device 110b (e.g., a TV). The second external electronic device 110b may store the information about the activity state received in operation 420. According to various embodiments, the information about the activity state may be stored in a mapping table, as illustrated in Table 1 above.

In operation 425, the second external electronic device 110b may receive control input to control the second external electronic device 110b (e.g., to turn on the second electronic device 110b) from the user. Upon receiving the control input to control the second external electronic device 110b (e.g., to turn on the second electronic device 110b) from the user, the second external electronic device 110b may output a preferred function (e.g., output a sports channel) at the time at which the control input is received, the information about the activity state received from the user device 100, and information (e.g., a mapping table) about a relationship between an activity state and preference information pre-stored in the second external electronic device 110b in operation 430.

Referring to FIG. 4B, in operation 435, a first external electronic device 110a may receive control input to control the first external electronic device 110a (e.g., an oven) from a user. For example, the control input in operation 435 may include one of more inputs to turn on/off the external electronic device 110a, switch to a particular channel, set a particular temperature, and information about a period for which a particular channel or a particular temperature is maintained.

In operation 440, the first external electronic device 110a may transmit information about the state in which the first external electronic device 110a is controlled (e.g., information about a change in the on/off state of the first external electronic device 110a, information about currently output content, information about a currently set temperature, and/or information about currently output music) to a user device 100 according to the control input in operation 435.

In operation 445, the user device 100 may identify context information. The context information may include time information, weather information, season information, and day information at the time of estimating the activity state of the user. However, the context information is not limited hereto, and may include other information related to estimating the activity state of the user.

In operation 450, the user device 100 may estimate the activity state of the user on the basis of control information (e.g., on/off information) and the context information (e.g., time information). For example, when the time at which the activity state of the user is estimated (e.g., when the control information is received in operation 440) is 7 a.m. (e.g., learned time) and the control information is an oven power state change (e.g., from off to on), the user device 100 may identify that the activity state of the user is a state of preparing a meal. When the control information is an oven power state change (e.g., from off to on) but the time at which the activity state of the user is estimated (e.g., when the control information is received in operation 440) is 3 a.m., the user device 100 may identify that the activity state of the user is not a state of preparing a meal.

In operation 455, the user device 100 may transmit information about the estimated activity state to a second external electronic device 110b (e.g., a TV). The second external electronic device 110b may store the information about the activity state received in operation 455. According to various embodiments, the information about the activity state may be stored in a mapping table, as illustrated in Table 1 above.

In operation 460, the second external electronic device 110b may output a preferred function (e.g., output a sports channel) using the information about the activity state received from the user device 100 and information (e.g., a mapping table) about a relationship between an activity state and preference information pre-stored in the second external electronic device 110b.

Figure 5A:
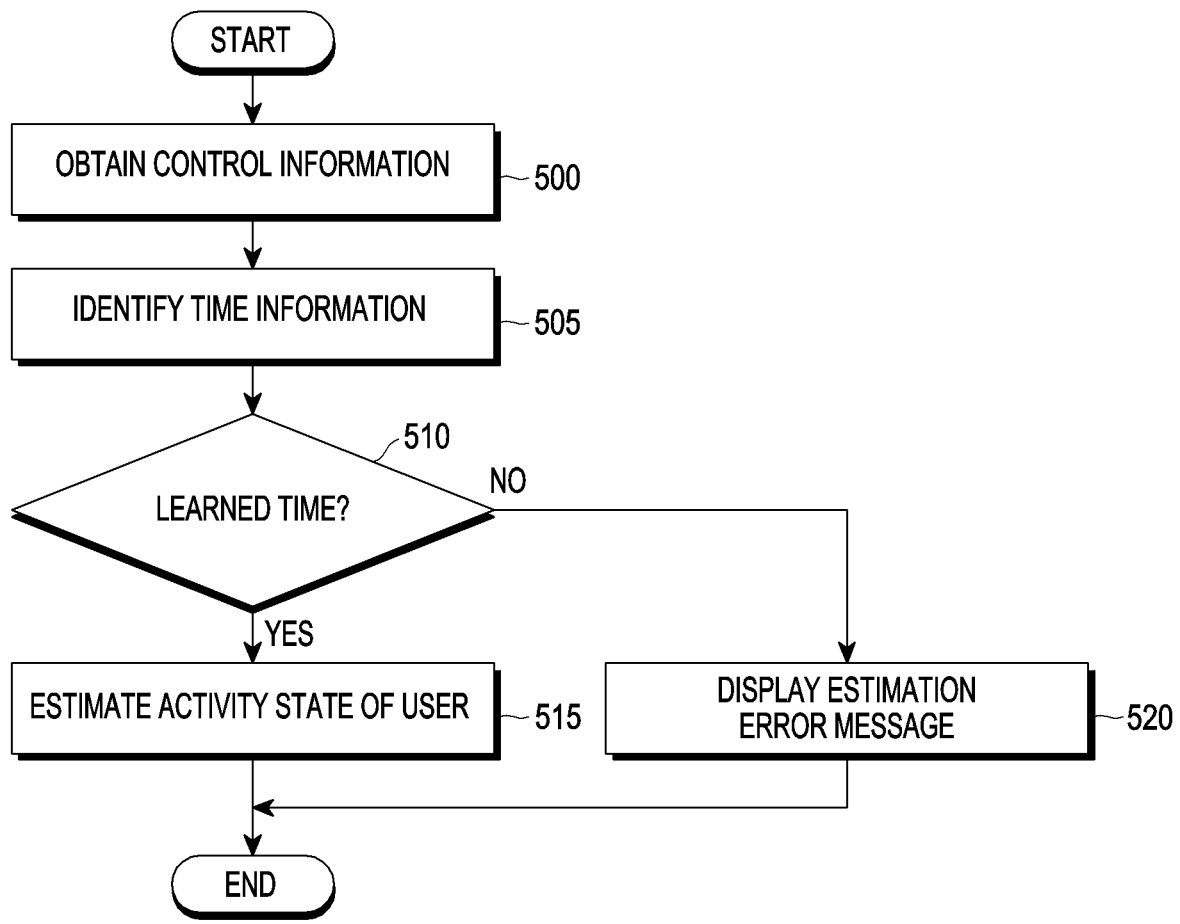
FIG. 5A illustrates a flowchart of an operation in which a user device estimates activity state of a user on the basis of current time information according to an embodiment.
Figure 5B:
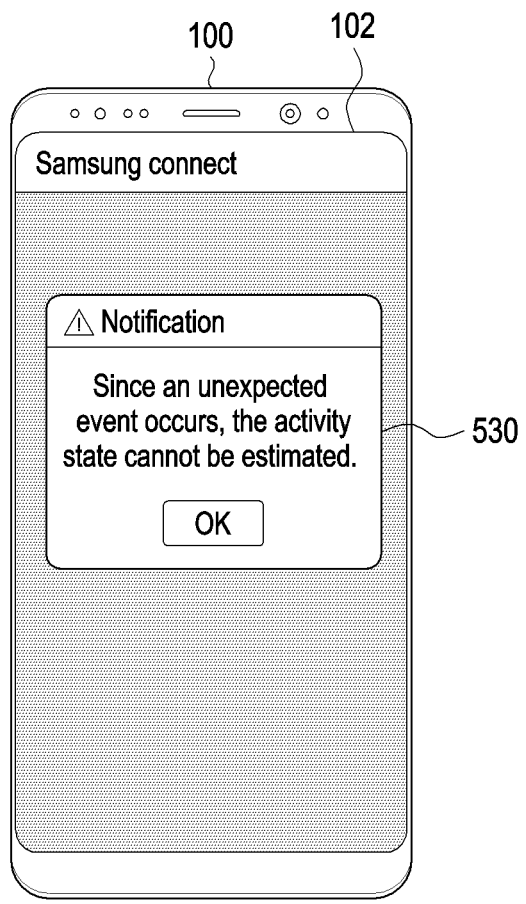
FIG. 5B illustrates a user interface displaying an error message according to an embodiment.

FIG. 5A illustrates a flowchart of an operation in which a user device estimates the activity state of a user on the basis of current time information according to an embodiment. FIG. 5B illustrates a user interface displaying an error message according to an embodiment.

Referring to FIG. 5A, in operation 500, a user device (e.g., the user device 100 of FIG. 1A) according to various embodiments may obtain control information. The control information may include information about input to turn on/off an external electronic device (e.g., the external electronic device 110 of FIG. 1A), information about input to switch to a particular channel, information about input to set a particular temperature, as well as information about a period for which a particular channel or a particular temperature is maintained.

In operation 505, the user device may identify information about the time at which the control information is obtained.

In operation 510, the user device may identify whether the time information about the time at which the control information is obtained corresponds to a learned time (e.g., 7 a.m.).

When the time information about the time at which the control information is obtained is the learned time (e.g., 7 a.m.) ("Yes" in operation 510), the user device may estimate the activity state of a user in operation 515. When the time information about the time at which the control information is obtained is not the learned time (e.g., 7 a.m.) ("No" in operation 510), the user device may display an estimation error message 530 on a display 102 of the user device 100 in operation 520, as illustrated in FIG. 5B.

Figure 6:
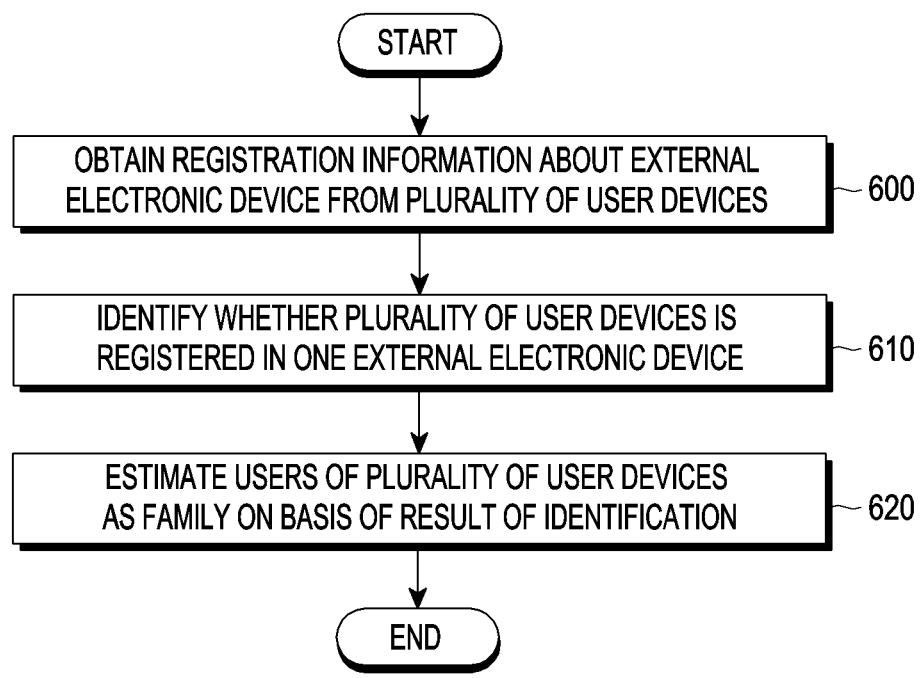
FIG. 6 illustrates a flowchart of an operation in which a server identifies a family among a plurality of user devices according an embodiment.

FIG. 6 illustrates a flowchart of an operation in which a server 120 identifies a family among a plurality of user devices according to an embodiment.

Referring to FIG. 6, in operation 600, a server (e.g., the server 120 of FIG. 1A) according to various embodiments may obtain registration information about an external electronic device from a plurality of user devices. Here, "registration" according to various embodiments may mean that, for example, a particular external electronic device (e.g., a TV) is stored in a user device 100 as a device forming a home network. That is, a registered device may mean a device registered to a home network. The registration information may be stored in the server 120.

In operation 610, the server (e.g., the server 120 of FIG. 1A) may identify whether a plurality of user devices (e.g., a first user device and a second user device) are registered to an external electronic device.

In operation 620, the server may identify that users of the plurality of user devices are family members on the basis of the result of the identification in operation 610. According to an embodiment, when the plurality of user devices are registered to one external electronic device, the first user device and the second user device may be identified as family devices.

Figure 7A:
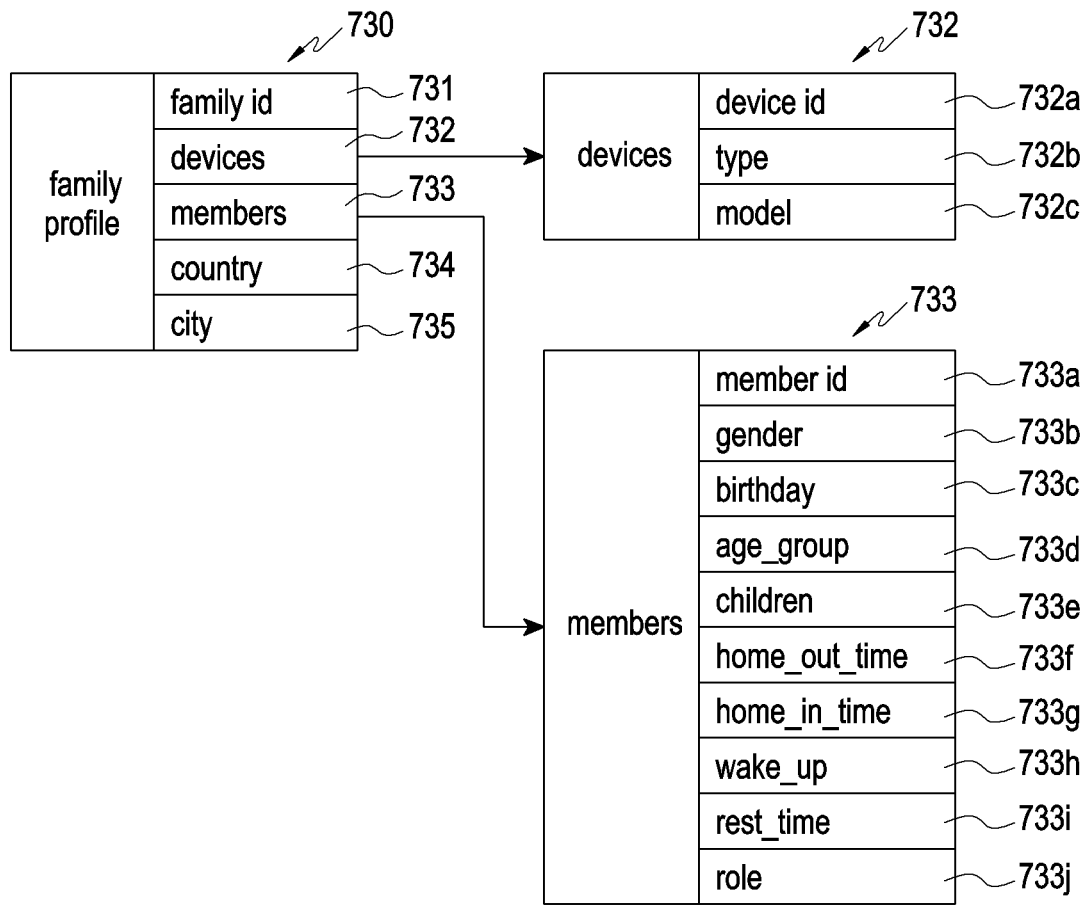
FIGS. 7A and 7B illustrate schematic diagrams of a family profile used to identify similar family characteristics according to various embodiments.
Figure 7B:
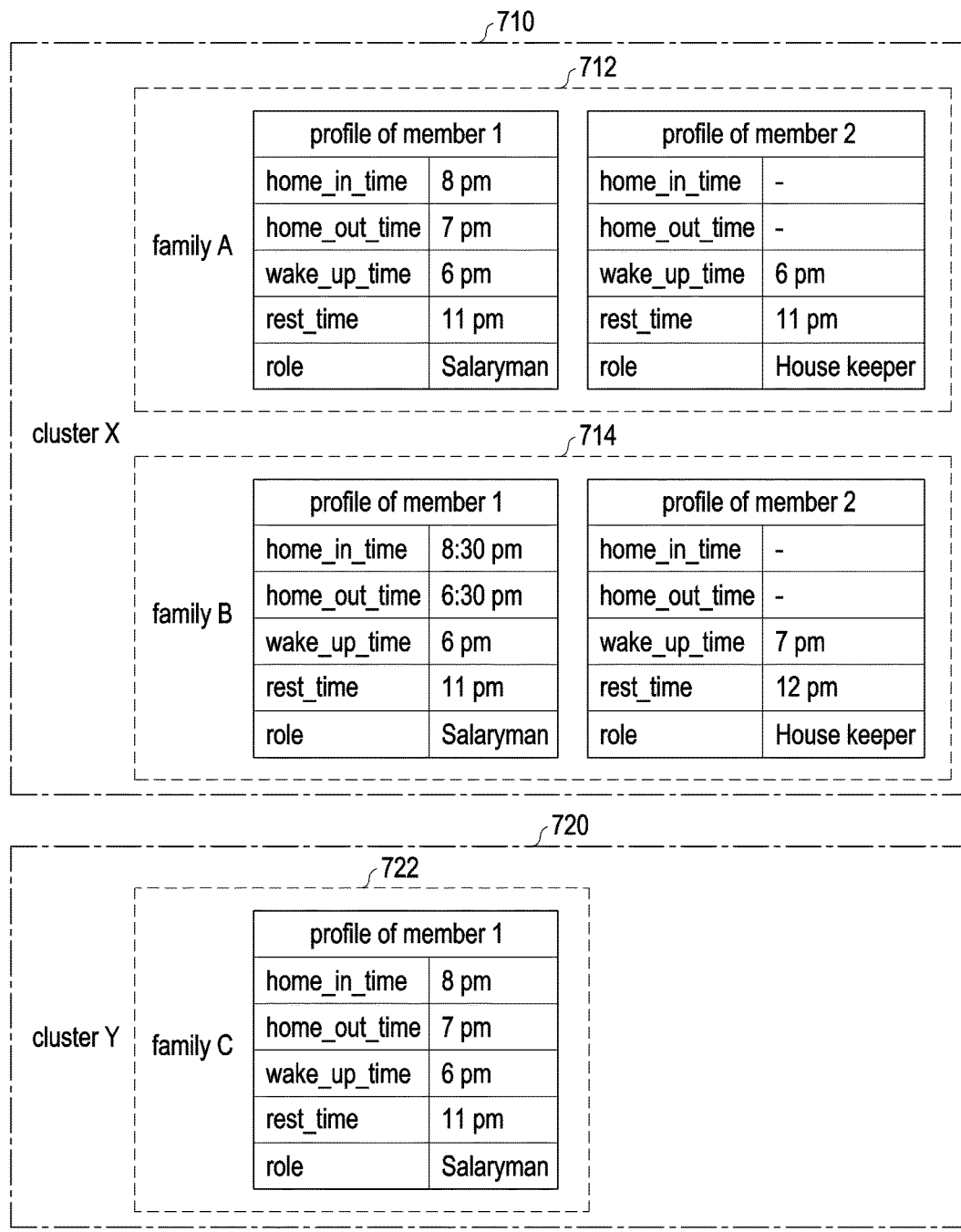

FIGS. 7A and 7B illustrate schematic diagrams of a family profile used to identify similar family characteristics according to various embodiments.

Referring to FIG. 7A, a family profile 730 may include a family identification (ID) field 731, a device field 732, a member field 733, a country field 734, and a city field 735.

The family identification (ID) field 731 may store a specific value assigned by a server (e.g., the server 120 of FIG. 1A).

The device field 732 may include a device identification field 732a, a type field 732b, and a model field 732c. The device identification field 732a may store a unique value assigned by a device (e.g., the user device 100). The type field 732b may store information about a device type (e.g., a TV, an oven, or an air conditioner). The model field 732c may store information about the model number of a device.

The member field 733 may include a member identification field 733a, a gender field 733b, a birthday field 733c, an age field 733d, a children number field 733e, a leave time field 733f, a return time field 733g, a wake-up time field 733h, a rest time field 733i, and a role field 733j. The member identification field 733a may store a unique value assigned by the user device 100 or the server 120. The gender field 733b may store information about the gender of a user. The birthday field 733c may store information about the birthday of the user. The age field 733d may store information about the age of the user. The children number field 733e may store information about the number of children of the user. The leave time field 733f may store information about the estimated leave time of the user. The return time field 733g may store information about the estimated return time of the user. The wake-up time field 733h may store information about the estimated wake-up time of the user. The rest time field 733i may store information about the estimated rest time of the user. The role field 733j may store information about the role (e.g., an office worker or a housewife) of the user determined on the basis of the estimated leave time and the estimated return time of the user. The pieces of information respectively stored in the gender field 733b, the birthday field 733c, the age field 733d, and the children number field 733e may be obtained from account information (e.g., login information or information input to join a home network service) of the user stored in the server 120 or the user device 100. The pieces of information respectively stored in the leave time field 733f, the return time field 733g, the wake-up time field 733h, the rest time field 733i, and the role field 733j may be values estimated by an estimation method according to various embodiments. According to various embodiments, a field for storing information about the number of family members (e.g., two-person family) may be further included.

Referring to FIG. 7B, a server (e.g., the server 120 of FIG. 1A) according to various embodiments may categorize at least one device according to family. The server 120 may categorize a plurality of devices (i.e., a plurality of users) into one family (e.g., family A 712 or family B 714) according to the method described with reference to FIG. 6. The server 120 may group (or cluster) similar families using information stored in family profiles. The server 120 may group similar families using at least some information included in the family profiles. For example, families having the same number of family members and the leave time and the return time of each member within a predetermined error range may be grouped as similar families. FIG. 7B illustrates an example in which the server 120 groups family A 712 and family B 714 having the same number of members, which is 2, and having the estimated leave time and the estimated return time of a particular user within a predetermined error range as a similar family group (e.g., cluster X 710). Further, FIG. 7B also illustrates an example in which family C 722 is different from the families included in cluster X 719 in terms of the number of family members, the estimated leave time, and the estimated return time, and is thus grouped as a family group (e.g., cluster Y 720) different from cluster X 719.

Figure 7C:
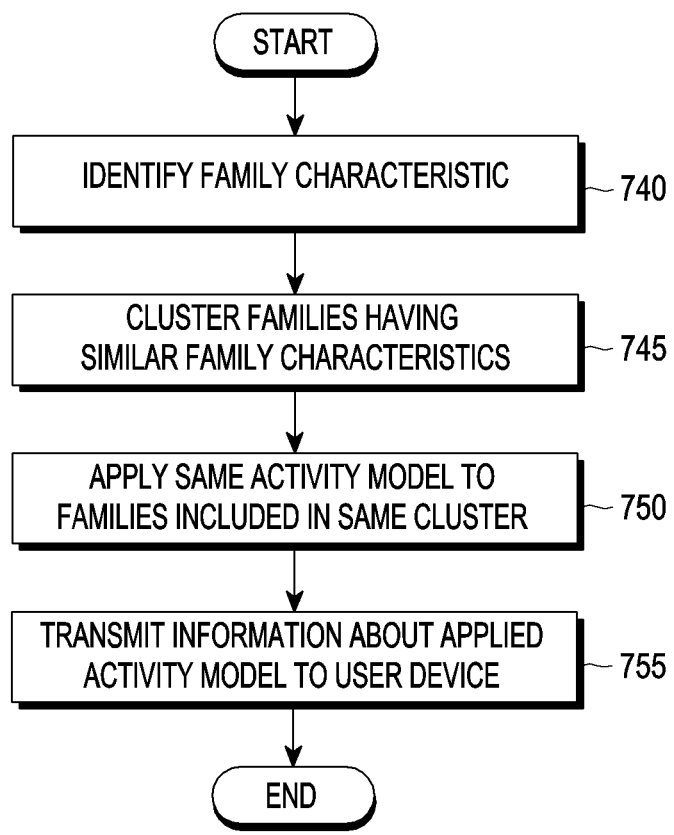
FIG. 7C illustrates a flowchart showing an example of applying same activity model to families included in same family cluster according to an embodiment.
Figure 7D:
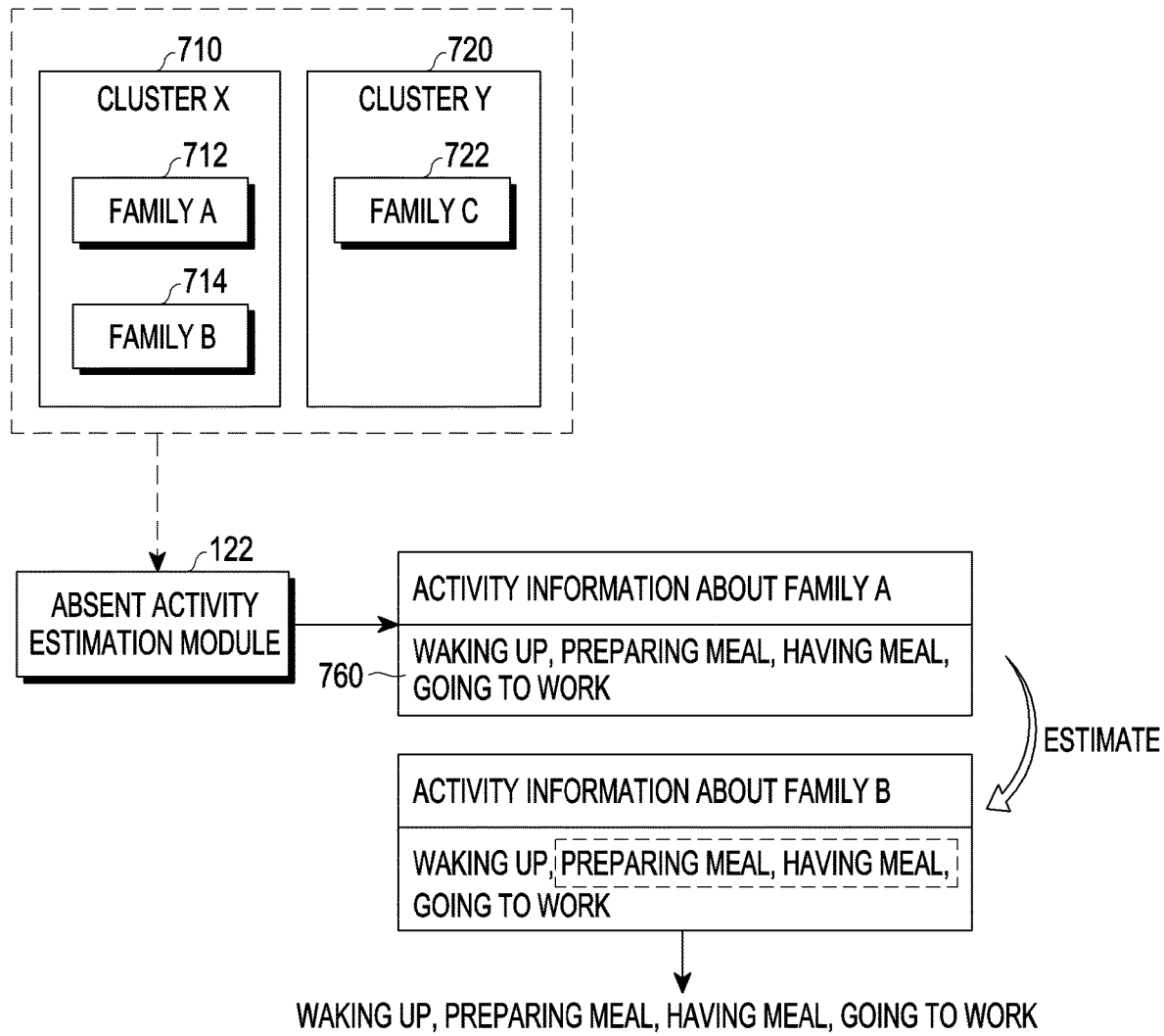
FIG. 7D illustrates a schematic diagram identifying family clusters and applying same activity model based on family characteristics according to an embodiment.

FIG. 7C illustrates a flowchart showing an example of applying same activity model to families included in same family cluster according to an embodiment. FIG. 7D illustrates a schematic diagram identifying family clusters and applying same activity model based on family characteristics according to an embodiment.

Referring to FIG. 7C, in operation 740, a server (e.g., the server 120 of FIG. 1A) according to various embodiments may identify a characteristic of family. The characteristic of the family may be identified by the family profile illustrated in FIG. 7A and FIG. 7B.

In operation 745, the server may cluster (e.g., group) families having similar family characteristics.

In operation 750, the server may apply the same activity model to families included in the same cluster. The activity model may include a list of estimated activity states (e.g., waking up, preparing a meal, having a meal, going to work) according to various embodiments.

In operation 755, the server may transmit information about the applied activity model to a user device (e.g., a user device of a member of family B).

Referring to FIG. 7D, a server may include the absent activity estimation module 122. The server may identify cluster X 710 and cluster Y 720 stored in the server (e.g., the server 120 of FIG. 1A). Cluster X 710 may include family A 712 and family B 714. Cluster Y 720 may include family C 722. An activity model 760 of family A may include a model, for example, in the order of waking up, preparing a meal, having a meal, and then going to work. The absent activity estimation module 122 may apply the activity model 760 of family A to family B 714, belonging to the same cluster. Accordingly, even in family B, having no specific external electronic device (e.g., oven), an activity state of "preparing a meal" may be inferred.

Figure 8:
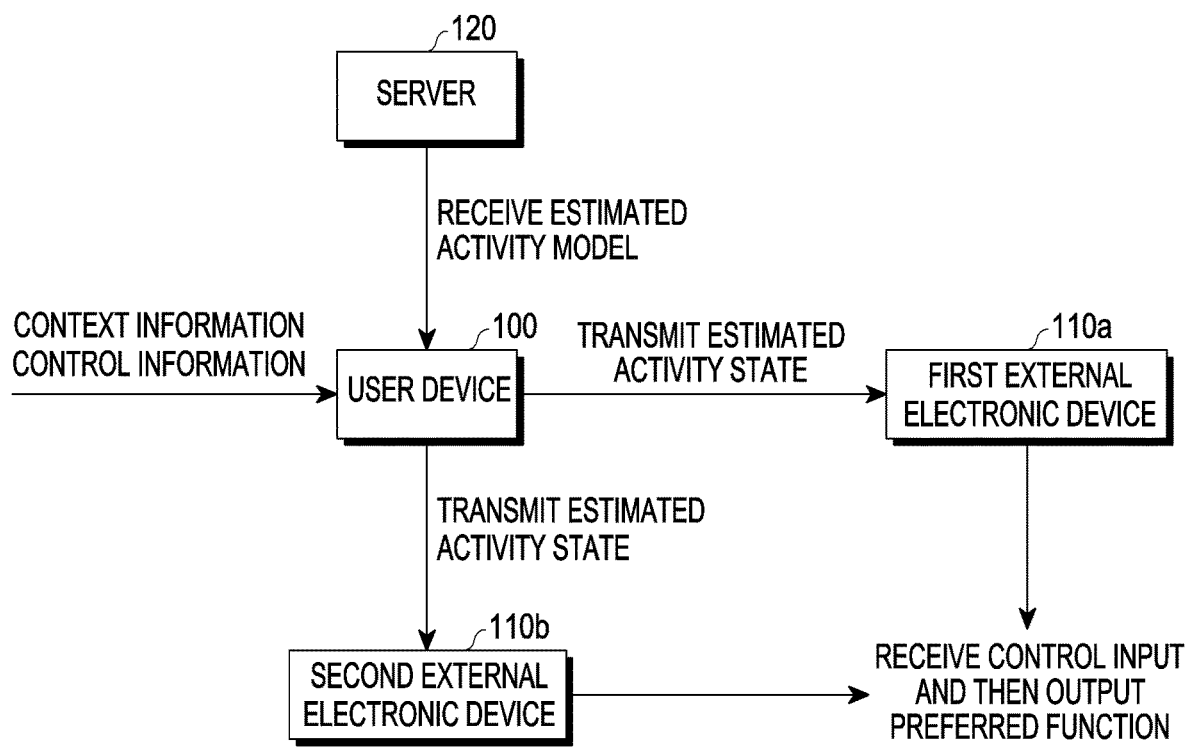
FIG. 8 illustrates an example method according to an embodiment.

FIG. 8 illustrates an example method according to an embodiment.

Referring to FIG. 8, a user device 100 may obtain context information and control information of an external electronic device. The user device 100 may receive an assumed activity model (e.g., waking up, preparing a meal, having a meal, going to work) from a server 120. The user device 100 may transmit, on the basis of the assumed activity model, information about an inferred different activity state (e.g., preparing a meal) to a plurality of external electronic devices (e.g., external electronic devices 110a and 110b) after a particular activity state (e.g., waking up) is finished. When receiving control input (e.g., to change the state of an external electronic device to be turned on) from a user, the plurality of external electronic devices may output a preferred function or preferred content (e.g., a sports channel) using an activity state and information about a preferred function (e.g., turning on a TV).

It should be appreciated that various embodiments and the terms used herein are not intended to limit the features set forth herein to particular embodiments. The various embodiments described herein may include various changes, equivalents, or replacements that may be rendered by those ordinary skilled in the art. In the drawings, similar reference numerals may be used to refer to similar or related elements. It is to be understood that a singular form corresponding to an item may also include a plural form, unless the relevant context clearly indicates otherwise. As used herein, phrases such as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments may be implemented as software including one or more instructions stored on a storage medium readable by a machine (e.g., the user device 100). For example, a processor of the machine may invoke and execute at least one of the one or more stored instructions from the storage medium. This may allow the machine to be operated to perform at least one function according to the invoked at least one instruction. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The method according to various embodiments herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A user device comprising:
   a memory configured to store instructions; and
   a processor configured to execute the stored instructions to:
   obtain context information and control information of at least one external electronic device from the at least one external electronic device, and obtain, from another external electronic device, information on a function executed in the another external electronic device, the control information indicating a state of the at least one external electronic device;
   estimate a first activity state of a user using the context information and the control information;
   estimate preference information using the function executed in the another external electronic device; and
   transmit the first activity state and the preference information to the at least one external electronic device.

2. The user device of claim 1, wherein the processor is further configured to, based on power status information of the at least one external electronic device, determine the first activity state of the user.

3. The user device of claim 1, wherein the processor is further configured to obtain a second activity state from a server, and wherein the second activity state is an activity state estimated based on a family cluster to which the user device belongs.

4. The user device of claim 3, wherein the processor is further configured to transmit the second activity state to the at least one external electronic device.

5. The user device of claim 1, wherein the context information comprises time information.

6. A control method of a user device, the control method comprising:
obtaining context information and control information of at least one external electronic device from the at least one external electronic device, and obtaining, from another external electronic device, information on a function executed in the another external electronic device, the control information indicating a state of the at least one external electronic device;
estimating a first activity state of a user using the context information and the control information;
estimating preference information using the function executed in the another external electronic device; and
transmitting the first activity state and the preference information to the at least one external electronic device.

7. The control method of claim 6, wherein the first activity state of the user is determined based on power status information of the at least one external electronic device.

8. The control method of claim 6, further comprising:
obtaining a second activity state from a server,
wherein the second activity state is an activity state estimated for a family cluster to which the user device belongs.

9. The control method of claim 8, further comprising:
transmitting the second activity state to the at least one of external electronic device.

10. The control method of claim 6, wherein the context information comprises time information.

11. A non-transitory computer-readable recording medium storing executable instructions, the executable instructions capable of causing a processor to:
obtain context information and control information of at least one external electronic device from the at least one external electronic device, and obtain, from another external electronic device, information on a function executed in the another external electronic device, the control information indicating a state of the at least one external electronic device;
estimate a first activity state of a user using the context information and the control information;
estimate preference information using the function executed in the another external electronic device; and
transmit the first activity state and the preference information to the at least one external electronic device.

12. The non-transitory computer-readable recording medium of claim 11, wherein the first activity state of the user is determined based on power status information of the at least one external electronic device.

13. The non-transitory computer-readable recording medium of claim 11, wherein the executable instructions are further capable of causing the processor to obtain a second activity state from a server, and
wherein the second activity state is an activity state estimated for a family cluster to which a user device belongs.

14. The non-transitory computer-readable recording medium of claim 13, wherein the executable instructions are further capable of causing the processor to transmit the second activity state to the at least one external electronic device.

* * * * *